United States Patent Office 3,157,616
Patented Nov. 17, 1964

3,157,616
ANTIOZONANT RUBBER COMPOSITIONS CONTAINING ALKYLENE BIS-HYDRAZINES
Hugh W. Stewart, deceased, late of Woodbury, Conn., by Ruthmarie Stewart, executrix, Middlebury, Conn., assignor to United States Rubber Company, New York, N.Y., a corporation of New Jersey
No Drawing. Filed Apr. 9, 1962, Ser. No. 186,271
7 Claims. (Cl. 260—45.9)

This invention relates to the protection of rubber from attack by ozone, and more particularly it relates to the use of certain bishydrazines as antiozonants for natural or synthetic rubbers.

It is known that conventional rubber vulcanizates suffer from three serious types of degradation: (a) bulk oxidation; (b) surface oxidation; and (c) ozone cracking.

Bulk oxidation is characterized by a slow decrease in tensile strength of the vulcanizate and a change in the ultimate elongation and in the modulus of elasticity without any apparent surface change. It is conveniently measured by observing changes in these bulk properties following accelerated aging in air or oxygen at elevated temperatures. Surface oxidation is the rapid, light-catalyzed oxidation of the vulcanizate to yield a hard, inelastic, but flexible, surface with shallow grooves. The bulk properties (tensile, modulus, etc.) are unaffected.

Both the bulk and surface oxidation of rubber vulcanizates can be inhibited by commercial antioxidants. These commercial antioxidants are of two types; the phenolic antioxidants typified by the alkylated cresols such as 2,6-di-tertiary-butyl-p-cresol and 2,2'-methylene-bis(4-methyl-6-tertiary-butylphenol) and the amine antioxidants typified by N-phenyl-beta-naphthylamine, and by the reaction products of diphenylamine with acetone.

The third type of degradation, ozone cracking, is also a surface phenomenon; however, it is not an oxidative but rather an ozonolysis phenomenon. Although there are only a few parts of ozone present per hundred million parts of air, this small amount of ozone is sufficient to cause the formation of deep cracks in stressed rubber vulcanizates exposed to the atmosphere. Unfortunately, most commercially available antioxidants offer little or no protection against ozone cracking. Accordingly, a principal object of the present invention is to provide a rubber vulcanizate that is more effectively protected against ozone cracking.

It has been found that certain bishydrazine derivatives are essentially non-discoloring and non-staining antiozonants for rubbery polymers. They may be represented by the following formulas

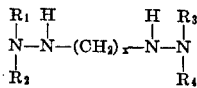

or

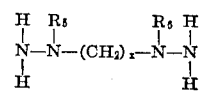

or

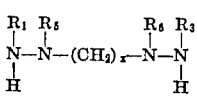

wherein $x=2$ to 10 and $R_1$ through $R_6$ are alkyl groups having 1 to 8 carbon atoms or cycloalkyl groups having 5 to 8 carbon atoms.

In copending application Serial No. 856,651, filed December 2, 1959, and now abandoned, it is shown that certain monohydrazines are effective antiozonants for rubbers. The use of bishydrazines in accordance with the present invention, as opposed to the monohydrazines, produces remarkably superior results in the form of greater effectiveness on a mole-for-mole basis, as well as more lasting results consequent to the fact that the presently used chemicals are less volatile and therefore do not tend to become lost from the rubber during compounding, storage and use.

U.S. Patent 2,822,354, Phillips et al., February 4, 1958, teaches the use of bishydrazines of the type

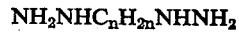

(wherein $n=1$ to 8) in aqueous emulsion polymerizations of monomers to produce synthetic rubber and related polymers. The bishydrazines disclosed by Phillips et al. are not effective in the present invention.

U.S. Patent 2,445,518, Dreyfus, July 20, 1948, discloses certain bishydrazines, some of which are the same as those used in the present invention, but Dreyfus does not teach the use of such chemicals as additives to rubbery polymers.

R. F. Evans, Chem. and Ind. (London), 1958, 915–16, reported the preparation of

from equimolar amounts of hydrazine and ethylene dichloride in boiling alcohol. This method can be used in making bishydrazines useful in the present invention.

The rubber stock to which the antiozonant composition of the invention is added may be any vulcanizable rubber which is ordinarily subject to attack by ozone, whether natural (Hevea) rubber, or a synthetic rubber, such as the rubbery homopolymers or copolymers of butadiene, isoprene and similar aliphatic conjugated diolefin hydrocarbons, such as butadiene-styrene copolymer rubber, butadiene-acrylonitrile copolymer rubber, butadiene-vinylpyridine copolymer rubber, isobutylene-isoprene copolymer rubber, ethylene-propylene-conjugated diolefin or non-conjugated diolefin (e.g. dicyclopentadiene) terpolymer, as well as butyl rubber, polychloroprene, and the like. Natural rubber and synthetic rubbers of the foregoing type may be designated by the general term diolefin polymer rubbers. The invention is also useful in saturated rubbers, such as rubbery olefin copolymers, e.g. ethylene-propylene copolymer. Generally from about 1/10 to 5 parts, by weight (all quantities are expressed herein by weight, unless otherwise indicated), of the antiozonant, per 100 parts of rubbery polymer are employed. The preferred rubbers are the polymers (homopolymers and copolymers) of butadiene and isoprene.

The rubber stock may be compounded with any desired conventional vulcanizing agents, accelerators, softeners, fillers, etc. Other conventional antioxidants or antiozonants may be present, as well as waxes of any desired kind. The compounded rubber stock containing the present antiozonant combination may be shaped and vulcanized in any desired manner in accordance with conventional practice. Standard test methods reveal in a striking manner the remarkable improvement in ozone resistance imparted to the vulcanizate by the present chemicals.

Instead of compounding the antiozonant with the rubber before vulcanization, the rubber article may be coated with the antiozonant after vulcanization in the form of its own liquid or as a solution in a volatile organic solvent such as acetone, alcohol or ether.

The following examples will serve to illustrate the practice of the invention in more detail.

EXAMPLE I

To demonstrate the remarkable effectiveness of the present chemicals as antiozonants, the Delman ozone test was used. This test is a relative viscosity degradation test described by Delman, Simms and Allison, Anal. Chem., 26, 1589 (1954). Two modifications were made (a) ozonized air instead of ozonized oxygen was used, and (b) the ozone concentration was 250 parts per million instead of 50 parts per million. The rubber used was styrene-butadiene (23.6% styrene). By actual tests the results with ozonized air were about the same as those with ozonized oxygen. The higher concentration of ozone gave a more accelerated test. The concentration of the test compound was 10% of the rubber polymer. The data given in Table I show that appreciable ozone protection was given by these compounds when compared with the percent of initial viscosity for unprotected rubber.

TABLE I.—DELMAN OZONE TEST

| Test Compound | Percent of Initial Viscosity After— | | | | | |
|---|---|---|---|---|---|---|
| | 1 hr. | 2 hr. | 3 hr. | 4 hr. | 5 hr. | 6 hr. |
| Blank or unprotected styrene butadiene rubber | 32.7 | 15.2 | | | | |
| 1,1'-Dimethylenebis(2,2-dimethylhydrazine) | 91.7 | 84.0 | 69.8 | 50.3 | 27.2 | 15.4 |
| 1,1'-Dimethylenebis(1-cyclohexylhydrazine) | 76.9 | 47.3 | 28.5 | 19.4 | | |
| 1,1'-Dimethylenebis(1-n-butylhydrazine) | 67.0 | 42.9 | 29.3 | 18.9 | | |
| 1,1'-Pentamethylenebis(2,2 di-n-butylhydrazine) | 90.2 | 67.5 | 47.9 | 27.0 | 17.2 | |
| 1,1'-Decamethylenebis(1-n-butylhydrazine) | 78.0 | 58.0 | 37.0 | 16.0 | | |

EXAMPLE II

The following represent tests as antiozonants in sulfur-vulcanized natural rubber, the stock being compounded as follows.

Component: Weight
Commercial natural rubber (Hevea pale crepe) _____ 100.00
Zinc oxide _____ 10.00
Lithopone ($BaSO_4.ZnS$) _____ 60.00
Snowflake whiting ($CaCO_3$) _____ 60.00
Zinc salts of cocoanut oil acids _____ 0.50
Sulfur _____ 3.00
Tetramethylthiuram monosulfide _____ 0.15
Test compound _____ 3.00

The stocks, including the control or blank, were cured for 30 min. at 274° F. They were cut into 1" x 4" strips, formed into a 2" bent loops, and were exposed to ozone in the Mast ozone box at 40° C., ASTM Designation 1149, tentative, revised in 1955. The ozone concentration was 50 parts per hundred million. See Table II.

Table II.—MAST OZONE BOX TEST

| Test Compound | Hours to Cracking | | | |
|---|---|---|---|---|
| | 1 | 2 | 3 | 4 |
| Blank | 4 | 8 | 12 | 48 |
| 1,1'-Dimethylenebis(2,2-dimethyl hydrazine) [1] | 4 | 10 | 20 | 136 |
| Blank | 3 | 5 | 7 | 11 |
| 1,1'-Pentamethylenebis(2,2-di-n-butylhydrazine) | 7 | 11 | 16 | 32 |

[1] Concentration of 5.00 parts instead of 3.00 parts per 100 parts rubber.

The degree of cracking at the various times of exposure has been indicated according to an arbitrary scale of measuring, using the numerals 1, 2, 3, and 4 to represent cracks which were very fine, fine medium, and coarse, respectively. The latter degree of cracking, 4, represents rubber in an unusable condition. Samples were also exposed to outdoor weathering tests.

EXAMPLE III

In Table III is presented the data from the outdoor bent static ozone test, ASTM Designation D518, tentative, issued in 1957. The formulation used was the same as that shown in Example II, and the concentration of the test chemical was in all cases 3 parts per hundred parts of rubber. The test pieces were 2" bent loops, described above, and were mounted outdoors inclined at 45° facing south.

Table III.—OUTDOOR BENT STATIC OZONE TEST

| Test Compound | Days to Cracking | | | |
|---|---|---|---|---|
| | 1 | 2 | 3 | 4 |
| Blank [1] | | 6 | 15 | 20 |
| 1,1'-Dimethylenebis(1-cyclohexylhydrazine) [1] | 7 | 42 | 45 | 48 |
| 1,1'-Decamethylenebis(1-n-butylhydrazine) [1] | 41 | 45 | 48 | 70 |
| Blank | | | 5 | 6 |
| 1,1'-Pentamethylenebis(2,2-di-n-butylhydrazine) | 5 | 7 | 26 | 70 |

[1] Cured for 15 minutes instead of 30 minutes.

In Table IV are presented the data from the outdoor flex-cracking test, ASTM Designation D430, adopted 1959. The compositions were as indicated in Example II, using 3 parts of the test chemical in all cases. The test pieces were ½" x 6" instead of 1" x 6". They were mounted facing south inclined at 12° from the vertical position. They were flexed at 165 cycles/minute.

TABLE IV.—OUTDOOR FLEX-CRACKING OZONE TEST

| Compound | Kilocycles to Cracking | | | |
|---|---|---|---|---|
| | 1 | 2 | 3 | 4 |
| Blank | | 223 | | 441 |
| 1,1'-Dimethylenebis(1-cyclohexylhydrazine) | 660 | | | 1,547 |
| 1,1'-Dimethylenebis(1-n-butylhydrazine) | 660 | | 1,547 | 1,766 |
| Blank | | | | 221 |
| 1,1'-Dimethylenebis(1-n-butylhydrazine) | 221 | | | 614 |
| Blank | | | 223 | 891 |
| 1,1'-Pentamethylenebis(2,2-di-n-butylhydrazine) | 1,545 | | | 1,766 |

These compounds gave very little staining and discoloration.

The foregoing examples are repeated, using natural rubber or such synthetic rubbers as cis-polybutadiene, cis-polyisoprene, butadiene-acrylonitrile copolymer, butadiene-vinylpyridine copolymer, and isoprene-isobutylene copolymer, polychloroprene, ethylene-propylene copolymer and ethylene propylene-diolefin terpolymer with generally similar results.

The following illustrate the preparation of bishydrazines useful in the invention.

*Preparation A.—1,1'-Dimethylenebis(2,2-Dimethylhydrazine)*

Under a nitrogen atmosphere, there was added 20.0 g. of crushed 95% $LiAlH_4$ (0.5 mole) to 400 ml. of ethyleneglycol dimethyl ether. After stirring for one hour at the refluxing temperature of 87° C., there was slowly added in one hour at the same temperature 113.8 g. of glyoxal bisdimethylhydrazone, M.P. 32–33° C. (0.8 mole). Refluxing was continued for 4½ hrs. Then there was slowly added 20 ml. of ethyl acetate in 5 minutes followed by a solution of 18 ml. of water in 18 ml. of ethyleneglycol dimethyl ether in 25 minutes. After cooling, the slurry was filtered and the filter cake was washed with ethyleneglycol dimethyl ether. The filtrate was distilled through a column ¾" x 8" packed with ¼" Berl saddles. Yield, 95.5 g.; theory, 117 g.; 81.6%; B.P. 46–48° C./3 mm.; $n_D^{25}$ 1.4451. It gave correct analyses for carbon, hydrogen and nitrogen.

*Preparation B.—1,1'-Pentamethylenebis(2,2-Di-n-Butylhydrazine)*

Glutaraldehyde bis(di-n-butylhydrazone) was first prepared by slowly adding 57.2 g. (14.3 g. real, 0.143 mole) of 25% aqueous glutaraldehyde to 41.2 g. (0.286 mole)

of 1,1-di-n-butylhydrazine, keeping the temperature at 15–20° C. by cooling. About 50 ml. of ether was added and the solution dried with KOH pellets. The ether was removed and the residue distilled under reduced pressure, B.P. 152–153° C./1 mm., $n_D^{25}$ 1.4742, 82% yield. Thereafter the procedure of Preparation A, above, was followed with the following exceptions. There was used 9.1 g. of LiAlH$_4$ (0.23 mole), 270 ml. of ethyleneglycol dimethyl ether, 32.1 g. of glutaraldehyde bis(di-n-butylhydrazone) (0.09 mole) (for its preparation see copending application, now Patent No. 3,142,658), 30 ml. of ethyl acetate and 30 ml. of water. The total refluxing reaction time was 23 hours. Yield, 18.8 g.; 54.7%; B.P. 162–163° C./0.5 mm.; $n_D^{25}$ 1.4550. It gave correct analyses for carbon, hydrogen and nitrogen.

*Preparation C.—1,1'-Dimethylenebis(1-Cyclohexylhydrazine)*

To 2680 ml. of anhydrous ethanol in a 5-l. flask there was added 246 g. of N,N'-dinitroso-N,N'-dicyclohexylethylenediamine (0.875 mole, M.P. 146–147° C.). On heating to the boiling point, it dissolved. Then there was slowly added 322 g. of sodium metal in small lumps (14.0 moles) in 2½ hrs. keeping the reaction mixture at the refluxing temperature, 80–100° C. When all the sodium had dissolved, the reaction mixture was cooled to 90° C. and 812 ml. of water was slowly added. It was exothermic during the first part of the addition and a white precipitate formed which redissolved. The alcohol was removed by distillation until the pot temperature reached 130° C. The top organic layer was separated from the hot 50% aqueous sodium hydroxide by decantation. Water was added, and after cooling, the organic layer, a pasty solid, was separated and slurried in diethyl ether. The ether-insoluble solid was isolated by filtration, washed with ether and dried. Yield, 66.6 g.; 30.0%; M.P. 104–106° C. When crystallized from ligroin (B.P. 90–120° C.), it melted at 104–106.5° C. and gave correct analyses for carbon, hydrogen and nitrogen.

*Preparation D.—1,1'-Dimethylenebis(1-n-Butylhydrazine)*

To a 2-l. 3-necked flask containing 176 ml. of concentrated hydrochloric acid (2.2 moles) and 200 ml. of water, there was slowly added 172.2 g. of N,N'-di-n-butylethylenediamine (1.0 mole). It was exothermic, heating to 75° C., and forming a crystalline hydrate not completely soluble. While stirring and maintaining a temperature of 75–80° C., a solution of 151.8 g. NaNO$_2$ (2.2 moles) in 100 ml. hot water was slowly added in 30 minutes. After maintaining a temperature of 75–80° C. for another hour, the top oil layer was separated, dried with K$_2$CO$_3$ and distilled under reduced pressure. Yield, 193.8 g. of N,N'-dinitroso-N,N'-di-n-butylethylenediamine; B.P. 146–147° C./1 mm.; $n_D^{25}$ 1.4776; theory, 230.3 g.; 84.2%. It gave correct analyses for carbon, hydrogen and nitrogen.

1,1'-dimethylenebis(1-n-butylhydrazine) was obtained from the reduction of 184 g. of N,N'-dinitroso-N,N'-di-n-butylethylenediamine with 294 g. of sodium and 2350 ml. of anhydrous ethyl alcohol as in Preparation C. The crude liquid organic layer was separated from the hot 50% sodium hydroxide solution, dried with KOH, and distilled through a column ¾" x 8" packed with ¼" Berl saddles. Yield, 52.0 g.; B.P. 89° C./1 mm.; $n_D^{25}$ 1.4619; theory, 161.9 g.; 32.1%; a low melting solid. It gave correct analyses for carbon, hydrogen and nitrogen.

*Preparation E.—1,1'-Decamethylenebis(1-n-Butylhydrazine)*

A solution of 100 g. of decamethylene dichloride (0.474 mole) and 274 g. of n-butylamine (3.80 moles) was heated in an autoclave at 125–135° C. for 13 hrs. Alcohol was used for rinsing the autoclave. The solution was slurried with an excess of 10% aqueous sodium hydroxide and the organic layer was separated and dried with potassium hydroxide. The liquid was distilled, first at atmospheric pressure, then under reduced pressure. Yield, 98.9 g. of N,N'-di-n-butyldecamethylenediamine; B.P. 176–178° C./0.5 mm.; theory, 134.9 g.; 73.3%. (6 hrs. gave a 66% yield.) This compound is a low melting solid, melting below 27° C. On exposure to air it rapidly forms a monohydrate. The monohydrate was crystallized from 75% aqueous acetone; M.P. 58–58.5° C. It gave the correct analyses for carbon, hydrogen and nitrogen.

A solution of 75.8 g. of N,N'-di-n-butyldecamethylenediamine (0.266 mole) in 240 ml. of water and 240 ml. of acetic acid (4.0 moles) was heated to 75° C. To this there was slowly added a solution of 43.9 g. of sodium nitrite (0.64 mole) in 100 ml. of water in one hour, keeping the temperature at 75–80° C. After heating at 75–80° C. for an additional hour, a solution of 140 g. of sodium hydroxide (3.5 moles) in water was added. The oil was separated while hot and poured slowly, while stirring, into cold water. The crystalline material was isolated and dried. Yield of N,N'-dinitroso-N,N'-di-n-butyldecamethylenediamine, 84.1 g.; theory, 91.3 g.; 92.1%; M.P. 47–48° C. When crystallized from petroleum ether (B.P. 30–60° C.) it melted at 47.5–49° C. It gave the correct analyses for carbon, hydrogen, and nitrogen.

1,1'-decamethylenebis(1-n-butylhydrazine) was obtained from the reduction of 212 g. of N,N'-dinitroso-N, N'-di-n-butyldecamethylenediamine as in Example 3, using 1800 ml. of anhydrous ethyl alcohol and 228 g. of sodium. The organic layer was separated from the 50% sodium hydroxide solution while still hot. The theoretical yield of crude material was obtained, M.P. 41–46° C.

The antiozonants of the invention are particularly remarkable for their essentially non-discoloring and non-staining properties. They are therefore especially advantageous for use where discoloration and staining cannot be tolerated.

Having thus described the invention, what is claimed and desired to protect by Letters Patent is:

1. A composition comprising 100 parts by weight of a rubbery polymer selected from the group consisting of diolefin polymers and ethylene-propylene copolymers, and from ⅒ to 5 parts by weight of a bishydrazine selected from the group consisting of those of the formulas:

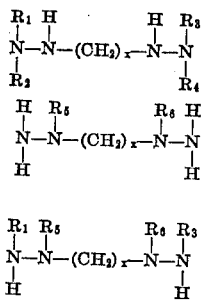

and

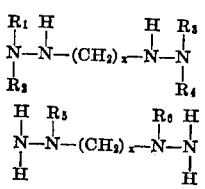

wherein $x=2$ to 10 and $R_1$ through $R_6$ are selected from the group consisting of alkyl groups having 1 to 8 carbon atoms and cycloalkyl groups having 5 to 8 carbon atoms.

2. A vulcanized composition comprising 100 parts by weight of a rubbery polymer selected from the group consisting of diolefin polymers and ethylene-propylene copolymers, and from ⅒ to 5 parts by weight of a bisydrazine selected from the group consisting of those of the formulas:

and

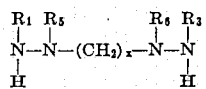

wherein $x=2$ to 10 and $R_1$ through $R_6$ are selected from the group consisting of alkyl groups having 1 to 8 carbon atoms and cycloalkyl groups having 5 to 8 carbon atoms.

3. A vulcanized composition comprising 100 parts by weight of a rubbery polymer selected from the group consisting of diolefin polymers and ethylene-propylene copolymers and from $\frac{1}{10}$ to 5 parts by weight of 1,1'-dimethylenebis (2,2-dialkylhydrazine) wherein the alkyl groups contain 1 to 8 carbon atoms.

4. A vulcanized composition comprising 100 parts by weight of a rubbery polymer selected from the group consisting of diolefin polymers and ethylene-propylene copolymers and from $\frac{1}{10}$ to 5 parts by weight of 1,1'-dimethylenebis(1-cyclohexylhydrazine).

5. A vulcanized composition comprising 100 parts by weight of a rubbery polymer selected from the group consisting of diolefin polymers and ethylene-propylene copolymers and from $\frac{1}{10}$ to 5 parts by weight of 1,1'-dimethylenebis(1-alkylhydrazine) wherein the alkyl group contains 1 to 8 carbon atoms.

6. A vulcanized composition comprising 100 parts by weight of a rubbery polymer selected from the group consisting of diolefin polymers and ethylene-propylene copolymers and from $\frac{1}{10}$ to 5 parts by weight of 1,1'-decamethylenebis(1-alkylhydrazine) wherein the alkyl groups contain 1 to 8 carbon atoms.

7. A vulcanized composition comprising 100 parts by weight of a rubbery polymer selected from the group consisting of diolefin polymers and ethylene-propylene copolymers and from $\frac{1}{10}$ to 5 parts by weight of 1,1'-decamethylenebis(1-alkylhydrazine).

References Cited in the file of this patent
Rubber Age, vol. 92, #5, February 1963, pp. 723–743.